June 21, 1955  T. E. DUGLE  2,711,299
ADJUSTABLE MOUNTING MEMBER
Filed March 2, 1954

INVENTOR.
THOMAS E. DUGLE
BY
J. Warren Kinney Jr.
ATTORNEY

2,711,299
ADJUSTABLE MOUNTING MEMBER

Thomas E. Dugle, Cincinnati, Ohio, assignor to Planet Products Corporation, Cincinnati, Ohio, a corporation of Ohio Application March 2, 1954, Serial No. 413,642

2 Claims. (Cl. 248—27)

This invention relates to an adjustable mounting member, and particularly to an idler pulley mount.

An object of the invention is to provide simple yet highly effective means for adjustably mounting an elongate element, such as a shaft, or the like, whereby its axis may be shifted relative to a support element.

Heretofore considerable difficulty has been encountered in providing suitable mounting means for elongate elements, such as shafts to which idler pulleys are mounted, particularly in those instances where it becomes desirable or necessary to tilt the axis of a shaft to accommodate changes in the tracking conditions of an endless member passing over the idler pulley carried by the shaft.

The subject device enables an operator to quickly align the shaft relative to a support element for disposing an idler pulley in desired alignment with the endless member passing thereover. Such adjustment may be effected in all three planes, thereby greatly enhancing the overall utility and value of the mount.

Another object of the invention is to provide an idler pulley mount which includes a housing, and means for adjustably securing the housing relative to a support element; a spool rotatably received within the housing, said spool including means for clamping a shaft thereto; and means for clamping the spool relative to the housing.

Still another object of the invention is to provide a mounting member having the hereinabove described characteristics which is fabricated from a minimum number of parts which co-operate whereby to securely though releasably position a shaft in any one of a variety of positions relative to a supporting element.

These and other objects are attained by the means described herein and as disclosed in the accompanying drawings, in which.

Figure 1:
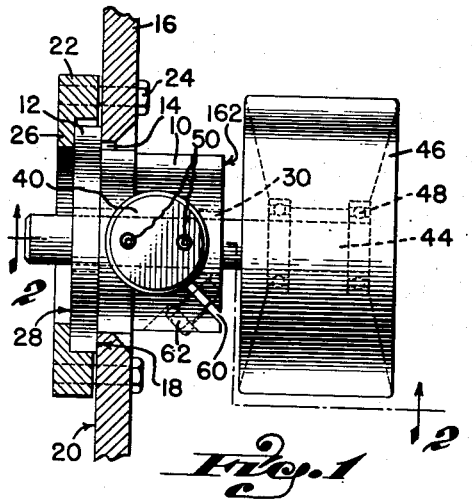
Fig. 1 is a side view of an adjustable mount embodying the teachings of the present invention, with portions of the clamping means cut away for clarity of detail and understanding.

With particular reference now to the drawings, the numeral 10 denotes generally a housing which, in the preferred embodiment of the invention, is substantially cylindrical, the rear end thereof terminating in an annular flange or mounting lip 12.

The body portion of the housing, that is, that portion which extends forwardly from lips 12, is adapted to be loosely received in and extend forwardly through an opening 14 provided in a support element 16, for locating the forward face 18 of mounting lip 12 in contacting relationship with rear face 20 of the support element.

Suitable means such as, by way of example, a clamp ring 22, may be employed for securely though releasably clamping housing 10 relative to support element 16 by means of bolts 24, which extend therethrough, and lip 26, which will be drawn against outer face 28 of lip 12 when the bolts are tightened.

Housing 10 is provided with a first, through, axial bore 30, and with a second bore 32 which intersects the first bore at right angles. As best illustrated in Fig. 2, bore 32 extends diametrically through the housing.

A cylindrical spool, denoted generally by the numeral 40, is rotatably receivable within the second bore 32, said spool having an opening 42 extending diametrically therethrough, which is dimensioned to receive an elongate member such as, by way of example, a shaft 44, upon the free forward end of which a pulley 46 may be rotatably mounted on bearings 48, note Fig. 1.

Suitable means, such as set screws 50, are carried by the spool for securely though releasably clamping the spool onto shaft 44.

Figure 2:
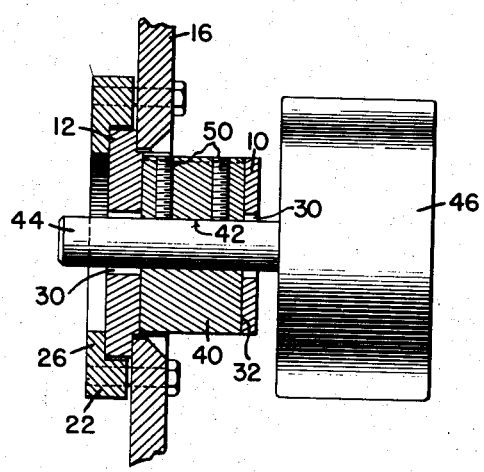
Fig. 2 is a view taken on lines 2—2 of Fig. 1.
Figure 3:
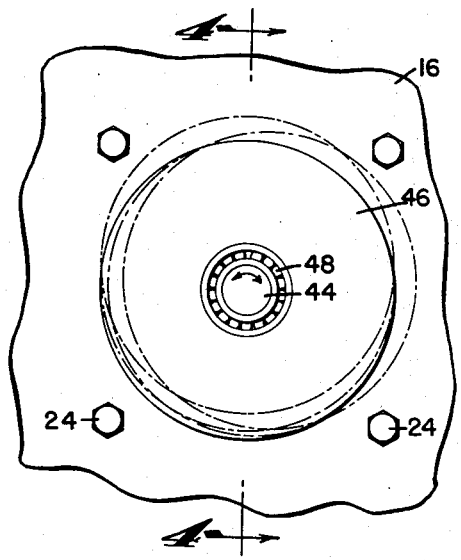
Fig. 3 is a front elevation of the device of Fig. 1 showing, in dotted outline, various positions which the pulley is capable of assuming.
Figure 4:
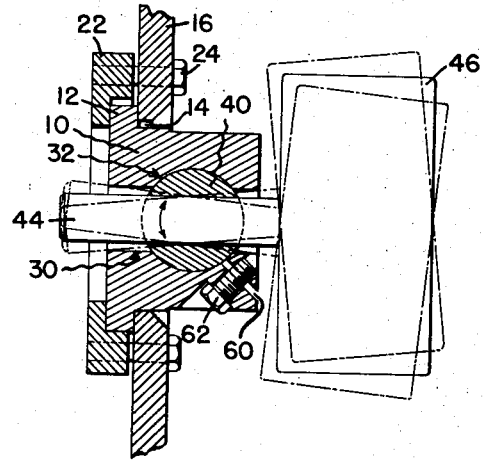
Fig. 4 is a sectional view taken on line 4—4 of Fig. 3.

As best illustrated in Figs. 2 and 4, shaft 44 extends through the first bore 30 of the housing, the diameter of said bore being appreciably larger than the diameter of opening 42 through the spool.

A slot 60 is provided in the forward portion of the housing, said slot being radially disposed with reference to the axis of the spool. A clamp bolt 62 spans said slot and is provided for clamping the housing onto the spool for thereby locking it in desired position relative to the axis of the first bore 30.

As best illustrated in Fig. 4, partial rotation of spool 40 results in shaft 44 being tilted about the axis of the spool for effecting substantial angular adjustment of the shaft in a plane normal to the axis of the spool.

It will likewise be noted that the entire axis of the spool may be shifted relative to the support element 16 by shifting the housing itself relative to said element.

From the foregoing it will be noted that the adjustable mount permits an elongate member, such as shaft 44, to be adjustably mounted in an infinite number of positions relative to fixed support element 16.

As illustrated in Figs. 1 and 4, slot 60 extends between front face 162 and the second bore 32 of the housing. The head of clamp bolt 62 is conveniently accessible for facilitating adjustment of the spool relative to the housing.

Shaft 44 may be shifted axially of spool opening 42 incident to loosening of set screws 50. It will be noted that clamp bolts 24, 62 and set screws 50 are all disposed on the same side of mounting element 16, thereby enhancing the convenience and utility of the device.

It should be understood that various changes may be made in the structural details of the device, within the scope of the appended claims, without departing from the spirit of the invention.

What is claimed is:

1. An idler pulley shaft mounting, comprising a housing having a first bore extending axially therethrough, and a second bore extending therethrough at right angles with and intersecting the first bore, a spool rotatably mounted in the second bore, said spool having a shaft receptive opening therethrough, means carried by the spool for fixedly though releasably securing the spool relative to a shaft extending through said opening and the first bore of the housing, means for clamping the spool to the housing, and means for releasably securing the housing to a support.

2. A mount for an idler pulley shaft, comprising a substantially cylindrical housing having a first bore extending axially therethrough, and a second bore extending diametrically thereof and intersecting the first bore, a spool rotatably mounted in the second bore, said spool having a shaft receptive opening extending diametrically therethrough, means carried by the spool for engaging and fixedly through releasably securing a shaft thereto with opposite ends of the shaft extending through the first bore of the housing, means for clamping the spool to the housing, and means for adjustably securing the housing to a support relative to the axis of the first bore.

References Cited in the file of this patent
UNITED STATES PATENTS 2,586,721    Rubin _____ Feb. 19, 1952